UNITED STATES PATENT OFFICE.

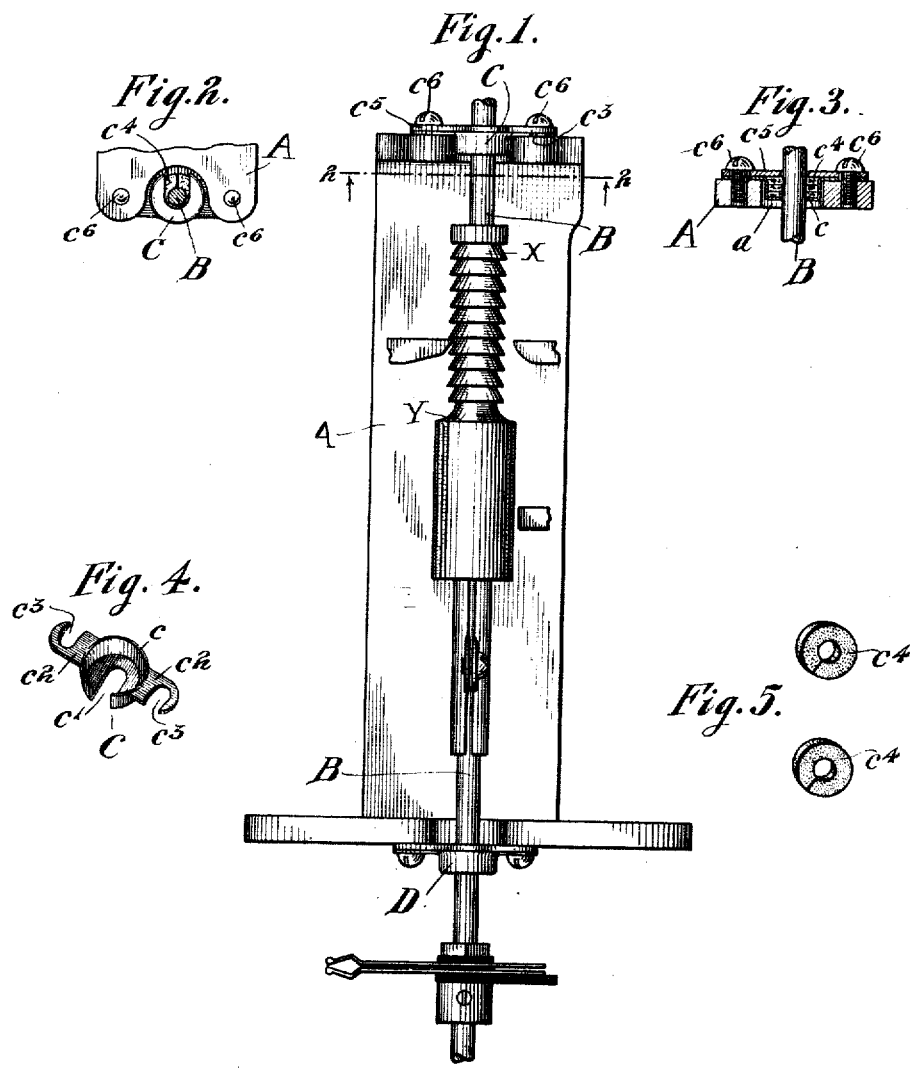

ALEXANDER E. KEITH, OF CHICAGO, ILLINOIS, ASSIGNOR TO AUTOMATIC ELECTRIC COMPANY, OF CHICAGO, ILLINOIS.

SHAFT-BEARING.

No. 831,874.　　　Specification of Letters Patent.　　　Patented Sept. 25, 1906.

Application filed November 9, 1904. Serial No. 231,978.

*To all whom it may concern:*

Be it known that I, ALEXANDER E. KEITH, a citizen of the United States of America, and a resident of Chicago, in the county of Cook and State of Illinois, have invented a certain new and useful Improvement in Shaft-Bearings, of which the following is a specification.

My invention relates to bearings adapted more particularly for use in connection with shafts which have both rotary and endwise movements.

Generally stated, the object of my invention is the provision of a simple and efficient bearing of the foregoing character; and a special object is to provide a bearing in which a shaft can be supported for both rotary and endwise movements, which can be easily applied to the structure comprising such shaft, and which will also serve as an oil-bearing for lubricating the shaft, it being essential in this respect that a perfect lubrication and a consequent perfect freedom of movement on the part of the shaft be obtained without danger of throwing or spattering the oil, and it is also an object, of course, to provide certain details tending to increase the general efficiency and serviceability of a shaft-bearing of this particular character.

To the foregoing and other useful ends my invention consists in the matters hereinafter set forth and claimed.

In the accompanying drawings, Figure 1 is a front elevation of a portion of a structure comprising an endwise and rotary shaft mounted in bearings embodying the principles of my invention. Fig. 2 is a horizontal section on line 2 2 in Fig. 1 looking in the direction of the arrows. Fig. 3 is a vertical section of the upper bearing shown in Fig. 1. Fig. 4 is a perspective of one of the oil-boxes comprised in said bearings. Fig. 5 shows a couple of the rings or washers of felt or other suitable material which are mounted in said boxes and which constitute a sort of packing for holding the oil or other lubricant.

In Fig. 1 the structure shown comprises a body A and the rotary and vertical switch-shaft B of a well-known form of automatic switch now employed in certain kinds of automatic telephone systems. The said shaft is supported in bearings C and D, embodying the principles of my invention. It is a matter of common knowledge that in a switching device of this character said shaft must have perfect freedom of movement, not only up and down or endwise, but also in a rotary manner. It will be readily understood, however, that my improved bearings, although of marked value in connection with a switching device of the type shown, may nevertheless be employed in connection with any other kinds of machinery in which they may be found applicable or useful. As shown, the bearing C is mounted upon the top of the said body A, while the bearing D is mounted on the bottom of said body. As the two bearings are of substantially the same construction, a description of one will suffice for both. The bearing C, for example, comprises a box $c$, preferably cup-shaped in character and provided with an opening $c'$, which extends through one side wall and also partially across its bottom wall. In addition the said box is provided with lateral or oppositely-arranged lugs $c^2$, having oppositely-arranged notches $c^3$, adapted to serve as bolt or screw openings. Thus constructed the said box is adapted to contain a plurality of split rings $c^4$ of felt or other suitable material, the same encircling the shaft B, as shown in Figs. 2 and 3. These rings are adapted to fit the interior of the box $c$ and can be held in place by a bearing-plate $c^5$. Screws $c^6$, extending downwardly through openings in the said bearing-plate and through the opening $c^3$ and into the upper portion of the said body A, are employed for holding the bearing in place. It will be seen at this juncture that the box $c$ hangs in a recess $a$, formed in the top of the said body. With this arrangement each bearing comprises a box containing a suitable packing, which is held in place by a bearing-plate having a round opening in which the said shaft is free to move up and down and rotate.

As illustrated, it is evident that the box for each bearing is readily removable by simply loosening the screws and without the necessity of removing its allotted bearing-plate. The felt rings or other packing holds the oil, and the shaft is thus effectually lubricated. When the shaft rotates or slides up and down, it does so freely and easily, but without throwing or spattering any of the oil. In other words, the packing within the box with which each bearing is provided serves not only to keep each bearing well lubricated, but to prevent the oil from dripping or running down the shaft. In fact, each bearing embodies a combined shaft lubricating and wiping device. Broadly considered, therefore, my invention contemplates the combination of a rotary and endwise-movable shaft supported in a bearing provided with a box or chamber containing packing or other suitable material in contact with the shaft throughout the latter's circumference, which is saturated with oil or other lubricant and which thereby keeps the shaft thoroughly lubricated without permitting the oil to run down the shaft or be thrown or spattered about.

Obviously both the cup or receptacle and the felt rings are removable in a direction laterally of the shaft. Consequently the entire wiping means or device can be removed without removing any other part of the structure. In other words, the cup and the rings can be applied to the shaft without taking the machinery apart, and the same can then be removed without disturbing the shaft or removing it from its bearings. In this way the wiping means or device is readily removable for purposes of repair or substitution.

It will be understood that the shaft B can be rotated and shifted endwise by any suitable means. For example, in a telephone-switching machine of the character indicated the teeth X, together with a suitably-operated pawl, (not shown,) constitute the means for giving the shaft a vertical endwise movement. The ratchet-teeth Y, together with another pawl, (not shown,) constitute the means for giving the shaft a step-by-step rotary movement. In this way the shaft is moved up and down and also rotated, and during such movements it is lubricated by the oil-saturated split rings in the box or cup C, and at the same time the oil is prevented from gumming on the shaft.

What I claim as my invention is—

1. A shaft, a bearing in which said shaft is supported for both rotary and endwise movements, a lubricating device comprising a chamber, oil-saturated packing contained in said chamber, said packing in contact with the shaft throughout the circumference of the latter, said chamber removable in a direction laterally of the shaft, and oppositely-arranged screws $c^6$ holding the bearing in place, there being a pair of oppositely-arranged lugs rigid with the said lubricating device and engaging said screws, the bearing closing the top of the lubricating device.

2. A shaft, a bearing in which said shaft is supported for both rotary and endwise movements, a lubricating device comprising a sheet-metal box, a packing encircling the shaft, contained in said box, in contact with the latter throughout its circumference, saturated with a suitable lubricant, said box removable in a direction laterally of the shaft, and fastening-screws for the bearing, there being oppositely-arranged lugs rigid with the lubricating device and provided with notches $c^3$ engaging said screws, the lubricating device removable without removing said screws.

3. A shaft, a bearing in which said shaft is supported for both rotary and endwise movements, a lubricating device comprising a horizontal box, oil-saturated split rings of suitable material encircling said shaft, contained in said box, in contact with the shaft throughout its circumference, said box and rings removable in a direction laterally of the shaft, and oppositely-arranged screws $c^6$ holding the bearing in place, there being a pair of oppositely-arranged lugs rigid with the said lubricating device and engaging said screws, the bearing closing the top of the lubricating device.

4. A shaft, a bearing in which said shaft is supported for both rotary and endwise movements, a lubricating device comprising a laterally-recessed removable box, oil-saturated packing for lubricating the bearing, contained in said box, adapted for wiping said shaft throughout its circumference, said box removable in a direction laterally of the shaft, and fastening-screws for the bearing, there being oppositely-arranged lugs rigid with the lubricating device and provided with notches $c^3$ engaging said screws, the lubricating device removable without removing said screws.

5. A shaft, a bearing in which said shaft is supported for both rotary and endwise movements, a lubricating device comprising a ring of oil-saturated fiber which both lubricates and wipes the shaft clean when it moves up and down, said fiber removable in a direction laterally of the shaft, means for supporting the said ring, and oppositely-arranged screws $c^6$ holding the bearing in place, there being a pair of oppositely-arranged lugs rigid with the said lubricating device and engaging said screws, the bearing closing the top of the lubricating device.

Signed by me at Chicago, Cook county, Illinois, this 28th day of October, 1904.

ALEXANDER E. KEITH.

Witnesses:
R. H. BURFEIND,
R. C. GIFFORD.